(12) United States Patent
Rak (10) Patent No.: US 8,400,400 B2
(45) Date of Patent: Mar. 19, 2013

(54) RAISED RAIL ENHANCED REDUCED KEYBOARD UPON A HANDHELD ELECTRONIC DEVICE

(75) Inventor: Roman P. Rak, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1534 days.

(21) Appl. No.: 11/935,182

(22) Filed: Nov. 5, 2007

(65) Prior Publication Data

US 2009/0115731 A1 May 7, 2009

(51) Int. Cl.
*G09G 5/00* (2006.01)
(52) U.S. Cl. ......... 345/168; 345/157; 345/167; 345/169
(58) Field of Classification Search ............... 345/168, 345/167, 169, 157
See application file for complete search history.

(56) References Cited

U.S. PATENT DOCUMENTS

| | | | |
|---|---|---|---|
| 5,339,097 A * | 8/1994 | Grant | 345/168 |
| 5,515,763 A * | 5/1996 | Vandervoort | 84/433 |
| 5,598,469 A * | 1/1997 | Preker | 379/433.07 |
| 6,940,490 B1 * | 9/2005 | Kim et al. | 345/168 |
| 2001/0003539 A1 | 6/2001 | Hahm et al. | |
| 2002/0015609 A1* | 2/2002 | Webber | 400/489 |
| 2008/0231476 A1* | 9/2008 | Liu | 341/20 |

FOREIGN PATENT DOCUMENTS

| | | |
|---|---|---|
| EP | 1156643 A | 11/2001 |
| EP | 1729315 A1 | 6/2006 |
| FR | 2435353 A | 4/1980 |
| WO | 2005041232 A1 | 5/2005 |

OTHER PUBLICATIONS

Extended European Search Report mailed Aug. 27, 2008. In corresponding application No. 07120007.5.
Examination Report mailed Oct. 7, 2009. In corresponding application No. 07120007.5.
Decision to refuse a European Patent application mailed May 26, 2011. In corresponding application No. 07120007.5.
Summons to Attend Oral Proceedings Pursuant to Rule 115(1)EPC mailed Nov. 24, 2010. In corresponidng application No. 07120007.5.
Examination Report mailed Apr. 23, 2010. In corresponding application No. 07120007.5.
Office Action mailed Oct. 3, 2011. In corresponding application No. 2,642,788.
Notice of Allowance mailed May 8, 2012; in corresponding Canadian Application No. 2,642,788.

* cited by examiner

*Primary Examiner* — William Boddie
*Assistant Examiner* — Leonid Shapiro
(74) *Attorney, Agent, or Firm* — Novak Druce Connolly Bove + Quigg LLP (57) ABSTRACT

A handheld wireless communication device is disclosed that has a housing, display, and keyboard. The keyboard consists of a plurality of keys having a right-hand keyfield located on a right-hand side of at least one elongate raised rail and a left-hand keyfield located on a left-hand side of at least one elongate raised rail. The keys of the keyfield have letters and numbers associated therewith. Each of the keyfields has an engagement surface configured for digital engagement by a user. Each of the at least one elongate raised rail has an upper fixed surface positioned above at least a portion of each keyfield located adjacent thereto so that each of the at least one elongate raised rails constitutes a tactile divider between adjacently located keyfields.

18 Claims, 5 Drawing Sheets

RAISED RAIL ENHANCED REDUCED KEYBOARD UPON A HANDHELD ELECTRONIC DEVICE

FIELD

This disclosure, in a broad sense, is directed toward a handheld communication device that has wireless communication capabilities and the networks within which the wireless communication device operates. The present disclosure further relates to establishing distinctive keyfields on the keyboard of the handheld electronic device through the use of raised rails.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

For example, many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another. It is important to make the keys upon the keyboard conducive for typing with respect to both functionality and accessibility. Specifically, increasing a key's functionality serves the user in that it makes the device more versatile if more easily, engaged in multiple applications. But, given the physical constraints of a handheld mobile device, increasing key functionality upon the keyboard without considering its affect upon key accessibility can actually make the device less conducive for typing. Simply put, a versatile device is truly versatile only if the user can make use of it. Thus, in addition to functionality, the user must feel the device is accessible such that minimal typing obstacles arise during normal course of use. To accomplish this goal, the keyboard must be more discernable to the user, both visually and tactilely. For example, a keyboard that is typing-conducive leads to lesser instances of unintended actuation of the keys. The elongate raised rails prevent keys from being unintentionally depressed when a neighboring key is actuated. As the user's digits teeter upon the elongate raised rail, an intended key may be simultaneously actuated with a portion of the user's digit not already resting upon the elongate raised rail. Since the entire digit need not be specifically moved to a particular key, the likelihood of unintended actuation is thereby reduced. Thus, it is beneficial to visually and tactilely distinguish the keyboard.

BRIEF DESCRIPTION OF THE DRAWINGS

Examplary methods and arrangements conducted and configured according to the advantageous solutions presented herein are depicted in the accompanying drawings wherein.

DETAILED DESCRIPTION

Figure 1:
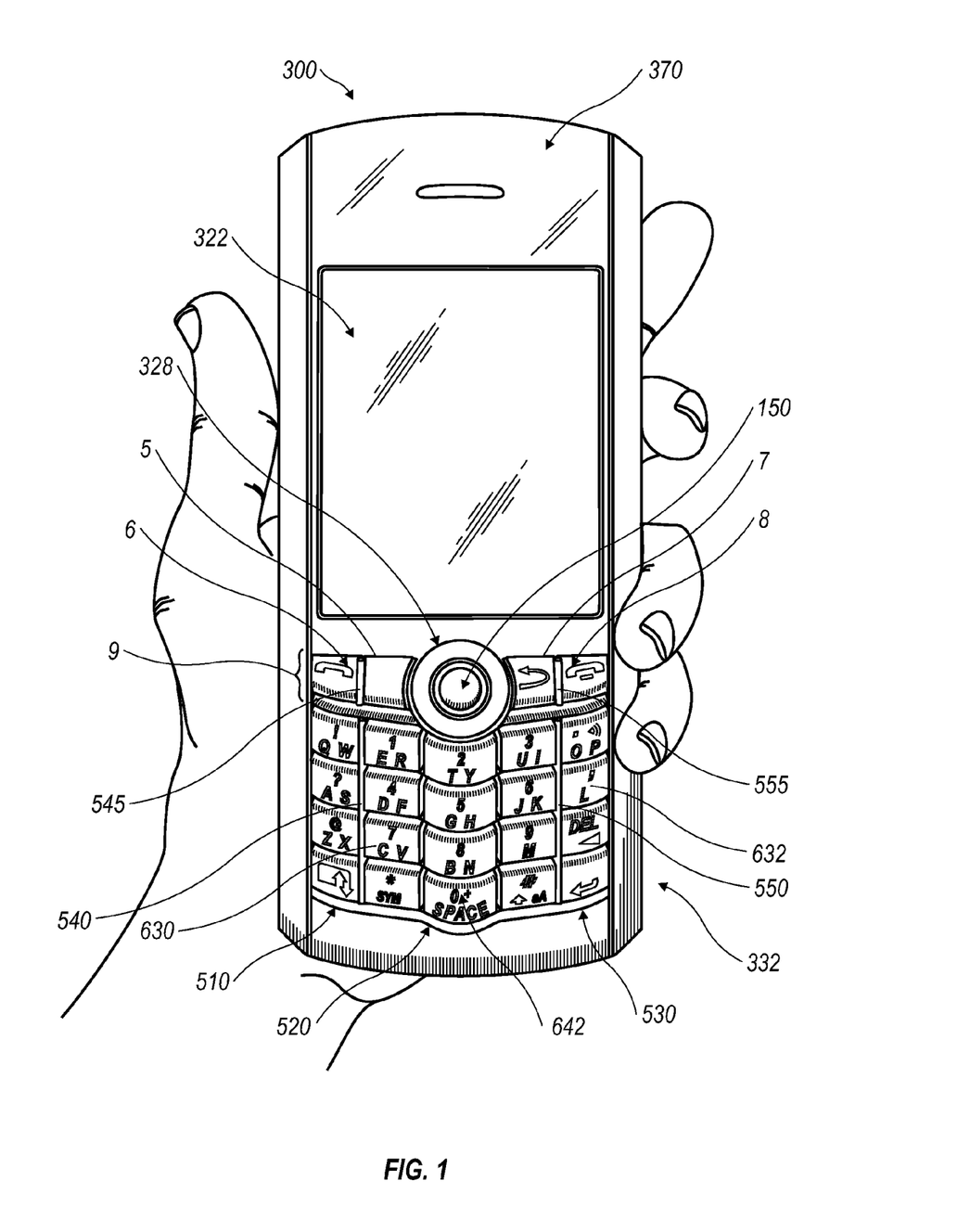
FIG. 1 illustrates a handheld wireless communication device configured according to the present teachings cradled in the palm of a user's hand.
Figure 2:
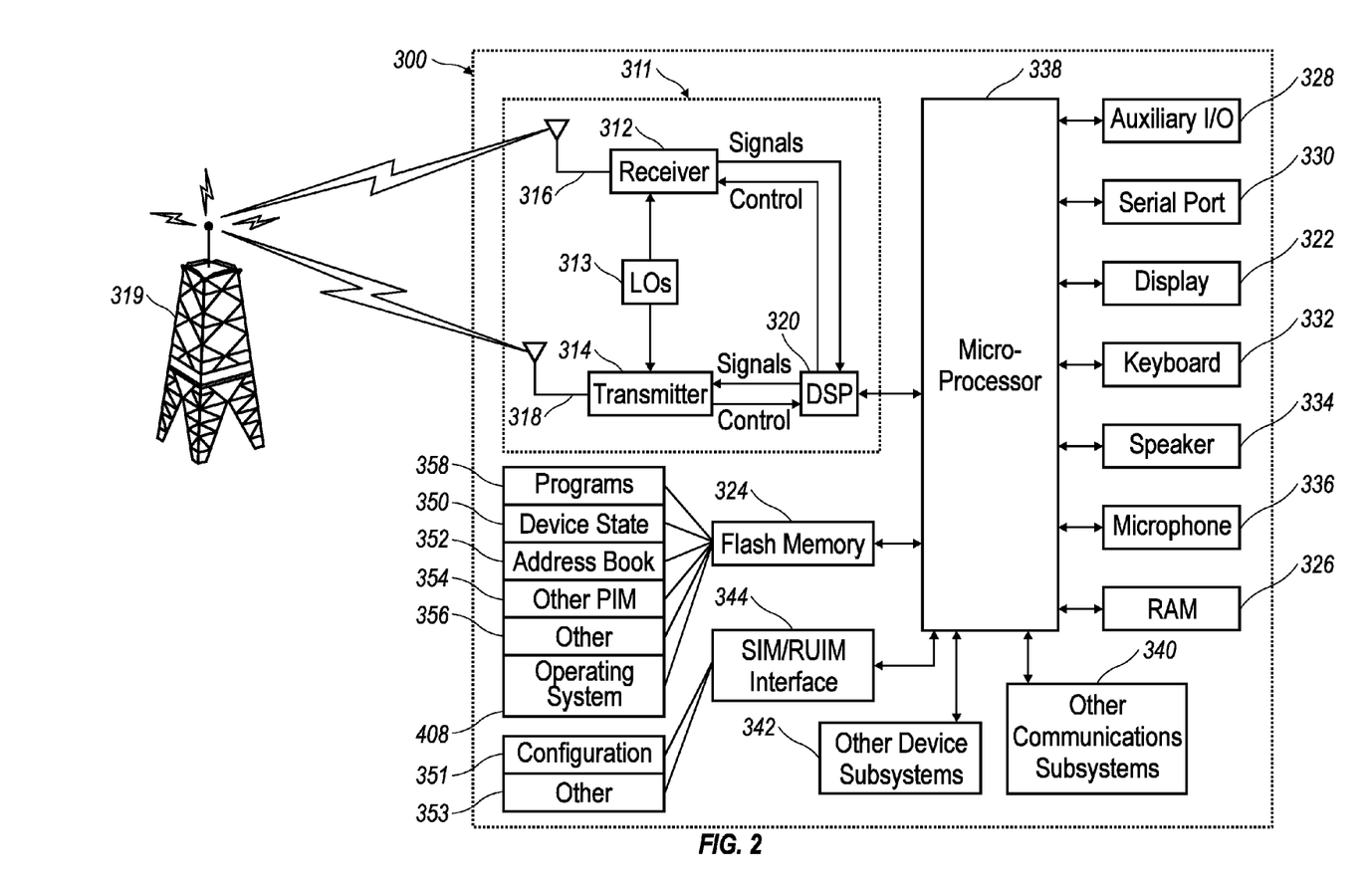
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a trackball navigation tool 325 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. The front face 370 of the device has a navigation row 9 and a left-hand key field 510, a center key field 520, and a right-hand key field 530, within the three key fields being alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input that acts as a cursor navigational tool and which is also exteriorly located upon the front face 370 of the device 300. Its front face location is particularly advantageous because it makes the tool easily thumb-actuable like the keys of the keyboard. A particularly usable embodiment provides the navigational tool in the form of a trackball 150 which is easily utilized to instruct two-dimensional screen cursor movement in substantially any direction, as well as act as an actuator when the trackball 150 is depressed like a button. The placement of the navigation tool is preferably above the keyboard 332 and below the display screen 322; here, it avoids interference during keyboarding and does not block the user's view of the display screen 322 during use. (See FIG. 1).

As illustrated in FIG. 1, the present disclosure is directed to a handheld wireless communication device 300 with elongate raised rails (540, 550) used to separate key fields (510, 520, 530). The handheld device 300 includes a hand cradleable body configured to be held in one hand by an operator of the device during text entry. A display 322 is included that is located on a front face 370 of the body and upon which information is displayed to the operator during text entry. Three key fields (510, 520, 530) are also located on the front face 370 of the elongate body and comprises a plurality of keys including a plurality of alphanumeric keys 630, symbol keys, and function keys. A navigation row 9 including menu keys (5, 6, 7, 8) and a navigation tool 328 is also located on the front face 370 of the body. The alphanumeric input keys comprise a plurality of alphabetic 632 and/or numeric keys 642 having letters and/or numbers associated therewith. The order of the letters of the alphabetic keys 632 on the presently disclosed handheld device 300 can be described as being of a traditional, but non-ITU Standard E.161 layout. This terminology has been utilized to delineate the fact that such a telephone keypad as depicted in FIG. 12 may not allow for efficient text entry on the handheld device 300.

The handheld wireless communication device 300 is also configured to send and receive voice communications such as mobile telephone calls. To facilitate telephone calls, two call keys 6, 8 ("outer keys") are provided in the upper, navigation row 9 (so-called because it includes the navigation tool assembly 328) at the outer ends of the navigation row 9. One of the two call keys is a call initiation key 6, and the other is a call termination key 8. The navigation row 9 also includes another pair of keys ("flanking keys") that are located immediately adjacent to the navigation tool 328, with one flanking key on either side of the navigation tool 328. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys, which include a menu call-up key 5 and an escape or back key 7. The menu call-up key 5 is used to bring up a menu on the display screen 322 and the escape key 7 is used to return to the previous screen or previous menu selection. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While in an examplary embodiment the operating system 408 is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the exemplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld wireless communication device 300 is cradleable in the palm of a user's hand. The handheld device 300 is provided with a keyboard 332 to enter text data and place telephone calls and a display screen 322 for communicating information to the user. A connect/send key 6 is preferably provided to aid in the placement of a phone call. Additionally, a disconnect/end key 8 is provided. The send key 6 and end key 8 preferably are arranged in the navigation row 9 including the navigation tool 328. Additionally, the navigation row 9 preferably has a menu call-up key 5 and a back key or escape key 7.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 5:
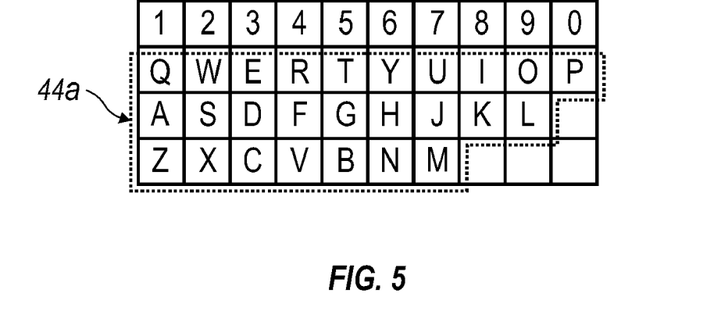
FIG. 5 illustrates an examplary QWERTY keyboard layout.
Figure 6:
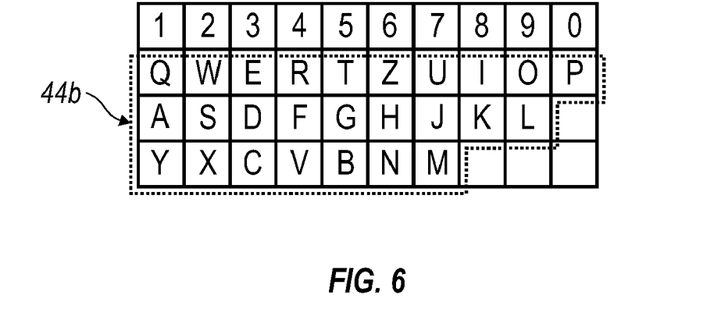
FIG. 6 illustrates an examplary QWERTZ keyboard layout.
Figure 7:
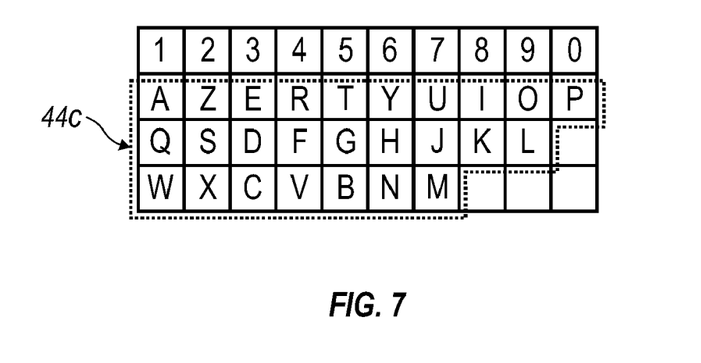
FIG. 7 illustrates an examplary AZERTY keyboard layout.
Figure 8:
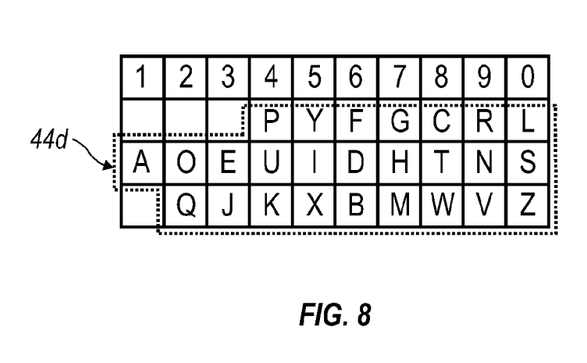
FIG. 8 illustrates an examplary Dvorak keyboard layout.
Figure 9:
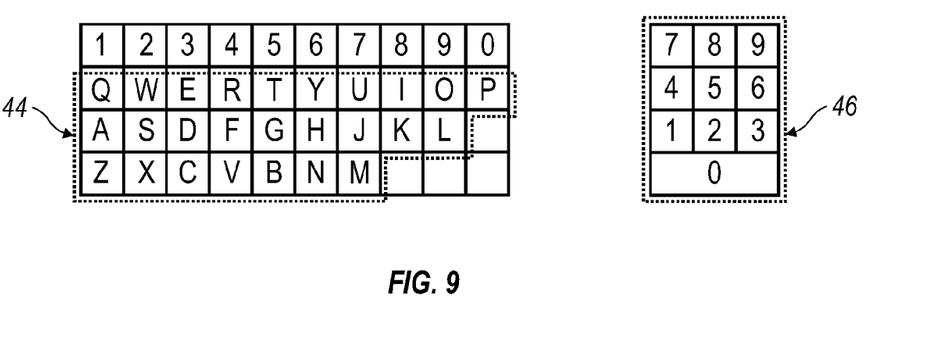
FIG. 9 illustrates a QWERTY keyboard layout paired with a traditional ten-key keyboard.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44*a* shown in FIG. 5. The QWERTZ keyboard layout is normally used in German-speaking regions; this alphabetic key arrangement 44*b* is shown in FIG. 6. The AZERTY keyboard layout 44*c* is normally used in French-speaking regions and is shown in FIG. 7. The Dvorak keyboard layout was designed to allow typists to type faster; this alphabetic key arrangement 44*d* is shown in FIG. 8. In other examplary embodiments, keyboards having multi-language key arrangements can be implemented.

Figure 10:
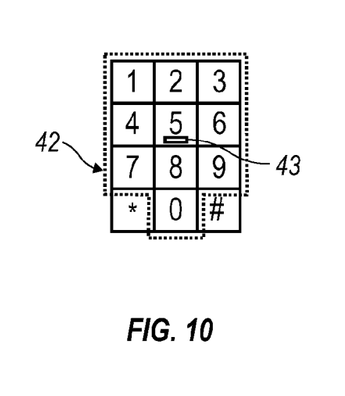
FIG. 10 illustrates ten digits comprising the numerals 0-9 arranged in a traditional, ITU Standard E.161 numeric telephone keypad layout, including the * and # keys flanking the 0 key.

Alphabetic key arrangements are often presented along with numeric key arrangements. Typically, the numbers 1-9 and 0 are positioned in the row above the alphabetic keys 44*a-d*, as shown in FIG. 5-8. Alternatively, the numbers share keys with the alphabetic characters, such as the top row of the QWERTY keyboard. Yet another examplary numeric key arrangement is shown in FIG. 10, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIGS. 10 and 11.

As shown in FIG. 10, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

Figure 11:
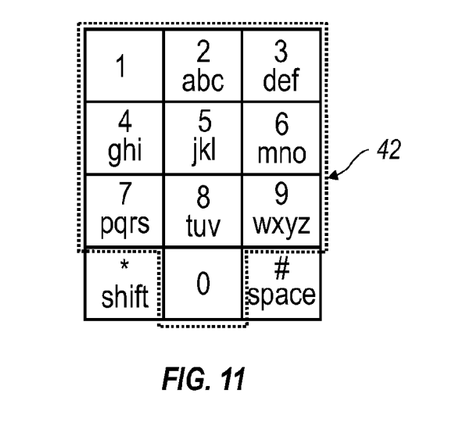
FIG. 11 illustrates a traditional or standard phone key arrangement or layout according to the ITU Standard E.161 including both numerals and letters.

FIGS. 10 and 11 both feature numeric keys arranged according to the ITU Standard E.161 form. In addition, FIG. 11 also incorporates alphabetic characters according to the ITU Standard E.161 layout as well.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Figure 4:
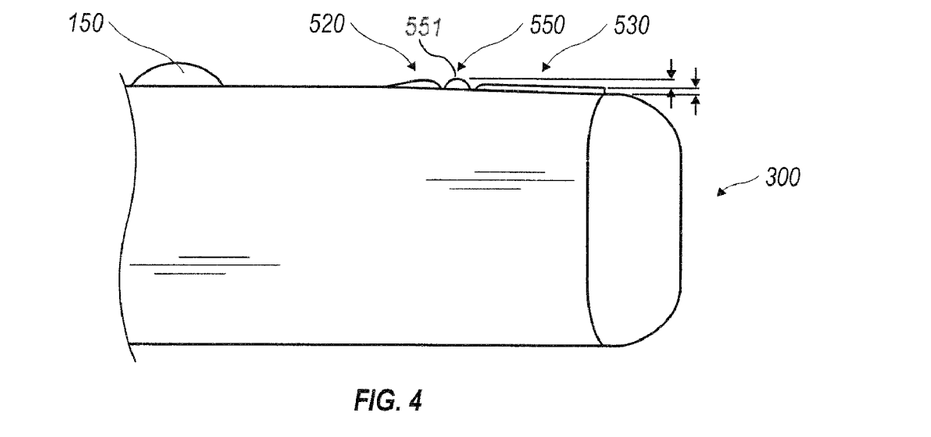
FIG. 4 illustrates a right-bottom view of the handheld wireless communication device.

Increasing the accessibility of the keys of the reduced alphabetic key layout is desirable because when the keys are more easily discernable the user experience is increased and typing errors can be reduced. As described herein, this can be accomplished in a variety of different ways. In at least one embodiment, the keys of the keyboard can be sequestered into more than one key field. In one embodiment, two key fields are created: a right-hand key field and a left-hand key field. These two key fields are separated by an elongate raised rail. The right-hand key field is located on a right-hand side of the elongate raised rail and the left-hand key field is located on the left-hand side of the elongate raised rail. The elongate raised rail visually distinguishes the key fields that it separates. Each of the key fields, specifically the key or keys within the key fields, have an engagement surface configured for digital engagement by the user. Digital engagement refers to the ability of the user to actuate a key by using any one of the user's fingers or thumbs, otherwise known as digits. In addition to digital engagement of the keys, other forms of engagement of the keys by the user are considered covered within the scope of this disclosure. The elongate raised rail has an upper fixed surface positioned above at least a portion of each key field located adjacent to it. The positioning of the elongate raised rail above at least a portion of the adjacent keyfields presents a tactilely divider between the adjacently located keyfields. In this arrangement, the fingers of the user encounter the raised portion of the elongate rail as the user's fingers move across the keyfields. In some embodiments, the keyfields or portions of keyfields located adjacent to the elongate raised rail are recessed thereby enhancing the tactile division between the key fields and the elongated raise rail. In yet another embodiment, the upper portion of the elongate raised rail is dome-shaped 551 (as illustrated in FIG. 4) in a widthwise cross-section taken perpendicular to a lengthwise axis of the respective rail, thereby further increasing the tactile difference between the elongate raised rail and keyfields. Alternatively, the elongate raised rail's upper portion may described as being widened so that more surface area is available for the digit resting upon it while entering text or other data into the handheld device. In at least one embodiment, the elongate raised rail, running parallel to the columns of keys of the keyboard, may extend to the width-wise top boundary and bottom boundary of the key field's bordering it. However, in other embodiments, the elongate raised rail may extend beyond the width-wise top boundary and bottom boundary of the key field's bordering it.

Figure 3:
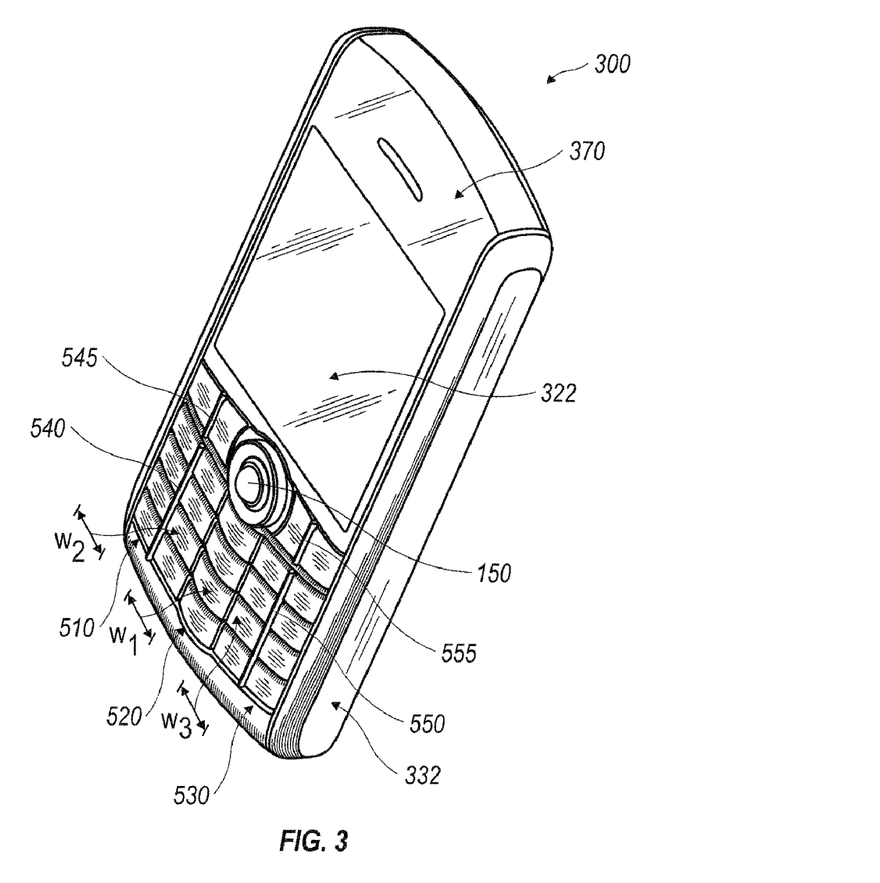
FIG. 3 illustrates a handheld wireless communication device with a plurality of elongate raised rails.

Likewise, in at least one embodiment illustrated in FIGS. 1 and 3, two elongate raised rails (540, 550) may be used to divide the plurality of keys into at least three key fields—a right-hand key field 530, a left-hand key field 510, and a center key field 520 located therebetween. One elongate raised rail 550 separates the right-hand key field 530 and the center key field 520, with the right-hand key field 530 being on the right-hand side of the elongate raised rail 550 and the center key field 520 to the left-hand side of the same elongate raised rail 550. In addition, elongate raised rails (545, 555) positioned to the left and right of the navigation tool 328 can separate menu keys within the navigation row 9. Another elongate raised rail 540, positioned to the left of the first elongate raised rail 550, can be used to separate the left-hand keyfield 510 and the center keyfield 520. In this embodiment, the center keyfield 520 would be on the right-hand side of the elongate raised rail 540 and the left-hand keyfield 510 would be on the left-hand side of the same elongate raised rail 540. The keys having numeric indicia could be limited to the center key field 520 in one alternative, and exist outside of the center keyfield 520 in another alternative, or a combination therebetween for a third alternative. Further, this disclosure does not limit use of elongate raised rails (540, 550) to two, and thus embodiments allowing for more than two elongate raised rails upon the keyboard 332 are within the scope of this disclosure.

With respect to the embodiment having three key fields, as illustrated in FIG. 3, the center key field 520 may be made up of three columns of keys. The center column ($W_1$) of keys of this center key field 520 may have a width greater than either the right ($W_3$) and left ($W_2$) columns adjacent to the center column. Likewise in at least one embodiment, the left-hand key field 510 and the right-hand key field 530 can be comprised of a single column of keys. However, any number of variations are encompassed within the scope of this disclosure such that any one of the key fields (510, 520, 530) can comprise one or more columns. Further, the three keyfields can consist of less than five columns of keys or more than a total of five columns of keys.

In this regard, the keyboard 332 can both be visually and tactilely distinguishable so as to render an environment more conducive to typing. The above-described multiple embodiments referencing the number of columns, elongate raised rails, key fields (510, 520, 530), width of columns and other options available upon the keyboard 332 can be combined in any number of ways to provide the most accommodating keyboard for the user.

With respect to visual benefits, the elongate raised rail (540, 545, 550, 555) serves to partition the keyboard into separate key fields (510, 520, 530), thus providing the user with a clearer visual perspective about the keyboard 332. Likewise, the key fields 510, 520, 530 are further partitioned into separate columns, thus providing for a greater level of discernment upon the keyboard. Likewise, adjusting the widths ($W_1$, $W_2$, $W_3$) of columns helps to further distinguish one column from another. In employing these keyboard-design-variations, the user is presented a much more visually distinguishable keyboard 332, and thus more conducive to typing. This is particularly helpful for the user that employs the hunt-and-peck typing style.

Likewise, these keyboard-design-variations also enable a more tactilely distinguishable keyboard 332. The elongate raised rail (540, 550, 545, 555) allows the user to discern by touch one key field (510, 520, 530) from another. Further, a user will likely teeter his digits upon the elongate raised rail.

When deciding to actuate a key, a user will likely be able to maintain some contact with the elongate raised rail while simultaneously actuating a particular key proximate to the elongate raised rail. In this respect, the user does not need to use an entire digit to actuate a key. The elongate raised rail serves as a balance to the user's finger while in the process of actuating a key. Therefore, the likelihood of inadvertently actuating a key is less likely to occur. In this same vein, the raised rail serves as a partition between adjacent keys and helps avoid their unintended actuation. At a minimum, the raised rail provides interference between adjacent keys, and because of its elevated crown above the several adjacent keys, a user must press-down over the rail in order to accidentally actuate a key on the opposite side of the rail.

In addition, the separate columns of keys within the key fields (510, 520, 530), especially when one column differs in width ($W_1$, $W_2$, $W_3$) from its adjacent columns, serves to tactilely distinguish the columns making up a particular key field (520). And variations in key-width also enable the user to distinguish particular keys by touch. FIG. 4 presents a right-bottom view of the handheld electronic device of FIG. 3 to show how the elongate raised rail 550 separates the right-hand key field 530 and the center key field 520. Providing many different ways in which to tactilely distinguish the keyboard 332 is particularly helpful for a user who touch-types. Together, the above-mentioned keyboard-design variations serve to make a more typing conducive environment for both the novice and experienced user of the handheld electronic device and its respective keyboard.

Examplary embodiments have been described hereinabove regarding both handheld wireless communication devices 300, as well as the communication networks 319 within which they operate. Again, it should be appreciated that the focus of the present disclosure is an elongate raised rail used to separate keyfields within the handheld communication device's keyboard such that a more visually and tactilely typing environment is provided for the user.

What is claimed is:

1. A handheld communication device comprising:
a housing assembly having:
a display located at an upper portion of a front face thereof for displaying information; and
a keyboard exposed for actuation below said display at a lower portion of said front face;
said keyboard comprising:
at least two elongate raised rails; and
a plurality of keys comprising:
a right-hand keyfield located on a right-hand side of one of said at least two elongate raised rails;
a left-hand keyfield located on a left-hand side of one of said at least two elongate raised rails;
at least a portion of said plurality of keys each having associated alphabetic indicia; and
at least a portion of said plurality of keys each having associated numeric indicia, said alphabetic indicia correspond to letters A-Z that are arranged in a QWERTY pattern and said numeric indicia correspond to at least numerals 1-9 that are arranged in an ITU Standard E.161 phone keypad pattern and wherein at least some of said numerals and at least some of said letters are associated with the same keys;
each of said keyfields has an engagement surface configured for digital engagement by a user when actuating individual keys of the respective keyfield; and
each of said at least two elongate raised rails has an upper fixed surface positioned above at least a portion of each keyfield located adjacent thereto so that each of said at least two elongate raised rails constitutes a tactile divider between adjacently located keyfields;
a navigation device located between the at least two elongate raised rails.

2. The handheld communication device as recited in claim 1, wherein said at least two elongate raised rails together divide the plurality of keys into at least three keyfields.

3. The handheld communication device as recited in claim 2, wherein said at least three keyfields comprise the right-hand keyfield, the left-hand keyfield and a center keyfield located therebetween.

4. The handheld communication device as recited in claim 3, wherein each of said at least three keyfields include keys having alphabetic indicia associated therewith.

5. The handheld communication device as recited in claim 3, wherein each key having numeric indicia associated therewith is located in said center keyfield.

6. The handheld communication device as recited in claim 2, wherein said right-hand keyfield and said left-hand keyfield is each composed of a single column of keys.

7. The handheld communication device as recited in claim 2, wherein said center keyfield is composed of three columns of keys.

8. The handheld communication device as recited in claim 7, wherein a center column of keys in said center keyfield has a width greater than right and left adjacent columns of keys to said center column of keys.

9. The handheld communication device as recited in claim 1, wherein portions of the keyfields located adjacent to the elongate raised rails are recessed thereby enhancing the tactile division between keyfields each elongate raised rail constitutes.

10. A keyboard for a handheld communication device comprising:
at least two elongate raised rails;
a plurality of keys comprising:
a right-hand keyfield located on a right-hand side of one of said at least two elongate raised rails; and
a left-hand keyfield located on a left-hand side of one of said at least two elongate raised rails;
at least a portion of said plurality of keys each having associated alphabetic indicia; and
at least a portion of said plurality of keys each having associated numeric indicia, said alphabetic indicia correspond to letters A-Z that are arranged in a QWERTY pattern and said numeric indicia correspond to at least numerals 1-9 that are arranged in an ITU Standard E.161 phone keypad pattern and wherein at least some of said numerals and at least some of said letters are associated with the same keys;
each of said keyfields has an engagement surface configured for digital engagement by a user when actuating individual keys of the respective keyfield; and
each of said at least two elongate raised rails has an upper fixed surface positioned above at least a portion of each keyfield located adjacent thereto so that each of said at least two elongate raised rails constitutes a tactile divider between adjacently located keyfields;
a navigation device located between the at least two elongate raised rails.

11. The keyboard as recited in claim 10, wherein said at least two elongate raised rails together divide the plurality of keys into at least three keyfields.

12. The keyboard as recited in claim 11, wherein said at least three keyfields comprise the right-hand keyfield, the left-hand keyfield and a center keyfield located therebetween.

13. The keyboard as recited in claim 12, wherein each of said at least three keyfields include keys having alphabetic indicia associated therewith.

14. The keyboard as recited in claim 12, wherein each key having numeric indicia associated therewith is located in said center keyfield.

15. The keyboard as recited in claim 11, wherein said right-hand keyfield and said left-hand keyfield is each composed of a single column of keys.

16. The keyboard as recited in claim 11, wherein said center keyfield is composed of three columns of keys.

17. The keyboard as recited in claim 16, wherein a center column of keys in said center keyfield has a width greater than right and left adjacent columns of keys to said center column of keys.

18. The keyboard as recited in claim 10, wherein portions of the keyfields located adjacent to the elongate raised rails are recessed thereby enhancing the tactile division between keyfields each elongate raised rail constitutes.

* * * * *